United States Patent
Ramaswamy et al.

(10) Patent No.: US 9,021,020 B1
(45) Date of Patent: Apr. 28, 2015

(54) APPLICATION RECOGNITION BASED ON MEDIA ANALYSIS

(71) Applicant: Amazon Technologies, Inc., Reno, NV (US)

(72) Inventors: Sharadh Ramaswamy, Sunnyvale, CA (US); Kenneth Mark Karakotsios, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 335 days.

(21) Appl. No.: 13/707,329

(22) Filed: Dec. 6, 2012

(51) Int. Cl.
  *G06F 15/16* (2006.01)
  *G06K 9/00* (2006.01)
(52) U.S. Cl.
  CPC .................................. *G06K 9/00624* (2013.01)
(58) Field of Classification Search
  USPC .......................... 709/203, 217, 219, 223, 224
  See application file for complete search history.

(56) References Cited

U.S. PATENT DOCUMENTS

| | | | |
|---|---|---|---|
| 6,173,445 B1 * | 1/2001 | Robins et al. ................. | 717/173 |
| 8,201,098 B1 * | 6/2012 | Bollman ....................... | 715/769 |
| 8,700,700 B2 * | 4/2014 | Shinomoto et al. ........... | 709/203 |
| 8,817,045 B2 * | 8/2014 | Cohen ........................... | 345/633 |
| 8,873,829 B1 * | 10/2014 | Tyra et al. ..................... | 382/140 |
| 2011/0302293 A1 * | 12/2011 | Buban ........................... | 709/224 |
| 2013/0173648 A1 * | 7/2013 | Tan et al. ...................... | 707/758 |
| 2013/0216094 A1 * | 8/2013 | DeLean ......................... | 382/103 |
| 2013/0268485 A1 * | 10/2013 | Cao et al. ...................... | 707/609 |
| 2014/0059549 A1 * | 2/2014 | Li et al. ......................... | 718/100 |
| 2014/0063269 A1 * | 3/2014 | Krig ........................... | 348/207.1 |
| 2014/0157210 A1 * | 6/2014 | Katz et al. ..................... | 715/863 |
| 2014/0282033 A1 * | 9/2014 | Cannon ......................... | 715/738 |

* cited by examiner

*Primary Examiner* — Lashonda Jacobs

(74) *Attorney, Agent, or Firm* — Lowenstein Sandler LLP

(57) ABSTRACT

A processing device receives, from a user device, image information associated with an image, the image information providing an indication of an application installed on the user device or a second electronic device. The processing device determines a descriptor associated with the application based on analyzing the image information. The processing device compares the descriptor to one or more stored image descriptors associated with each of a plurality of known applications. Based at least in part on the comparing, the processing device determines identifying information associated with the application. The processing device sends the identifying information to the user device.

33 Claims, 8 Drawing Sheets

APPLICATION RECOGNITION BASED ON MEDIA ANALYSIS

BACKGROUND

An individual who sees an application running on a user device (e.g., who watches someone playing a computer game) may wish to purchase the application. However, in some instances the user may not know what the application is, or may not know where to purchase the application.

BRIEF DESCRIPTION OF THE DRAWINGS

The embodiments described herein will be understood more fully from the detailed description given below and from the accompanying drawings. These drawings are for explanation and understanding, and should not be taken to limit the application to the specific embodiments described.

DETAILED DESCRIPTION

Methods and systems for identifying running applications are described herein. A user of a first user device (e.g., a tablet computer or mobile phone) may observe an application running on a second user device. If the user desires the application, that user may point an image sensor associated with the first user device (e.g., an integrated camera) at a display of the second user device and capture an image of the application in a state of execution. For example, the first user device may capture a screen shot of the application running on the second user device. The first user device may then send the image to an application recognition server. The application recognition server may compare the image to images associated with multiple different applications to identify the running application represented in the image. Once the server system identifies the application, it may send information pertaining to that application back to the first user device. For example, the application recognition server may notify the first user device of an identity of the application, and may direct the first user device to an online marketplace (e.g., an application (app) store) where the application can be purchased. The user may then purchase the application, and it may be installed on the first user device.

Embodiments of the present invention provide a simple, easy and convenient system for facilitating the purchase of applications on user devices. Embodiments minimize an amount of user effort that is expended to purchase an application. Under traditional systems, user actions may include manually figuring out an identity of an application that they are interested in, finding a vendor of the application, navigating to a web site of the vendor, finding the application on the vendor's store, purchasing the application, and installing the application. In some embodiments, user actions may be reduced to taking an image of a running application. Some or all of the subsequent steps of identifying the application, finding a vendor, locating the application on the vendor, purchasing the application, downloading the application and installing the application may be automated in embodiments of the present invention. This may save user time, increase the likelihood that the user will purchase the application, and improve revenues for the vendor.

Figure 1:
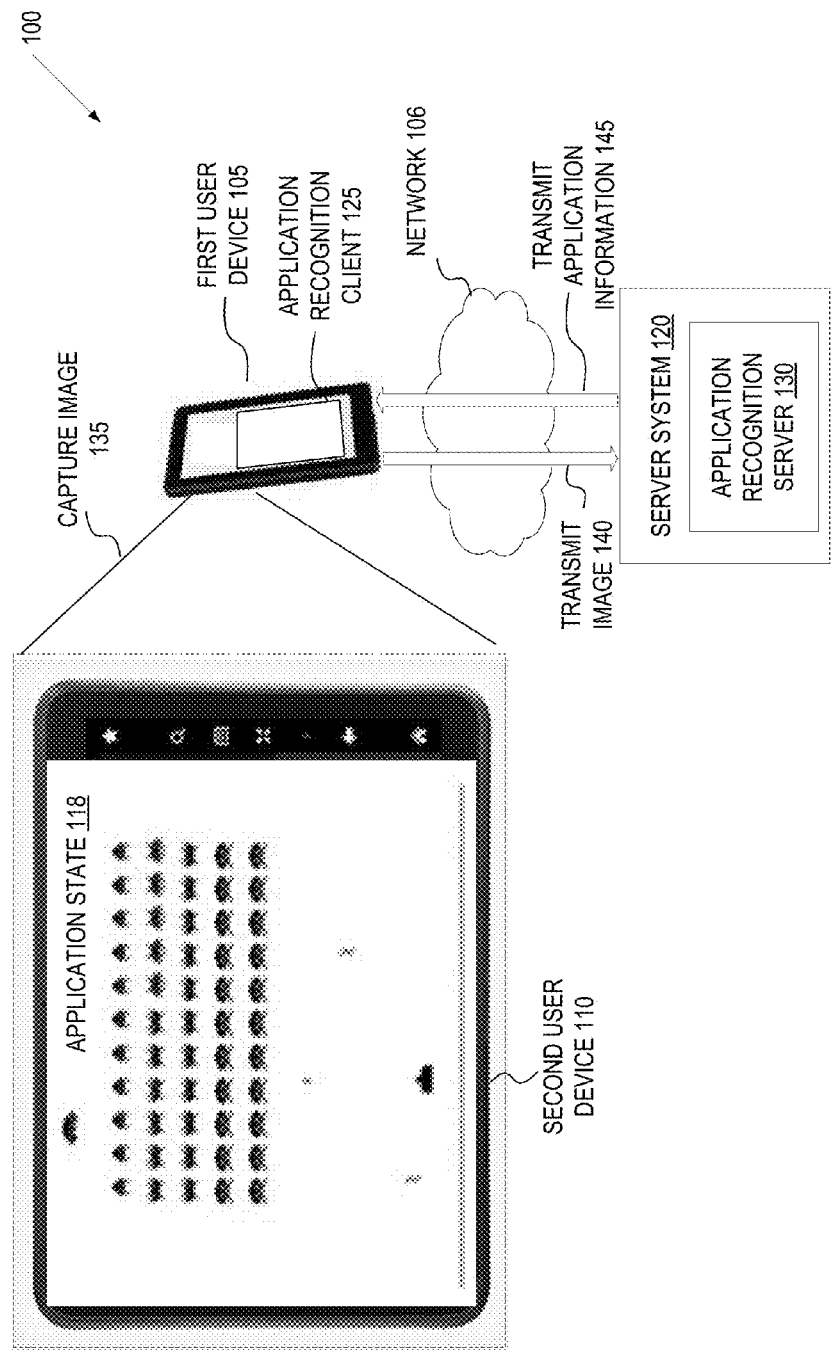
FIG. 1 illustrates an example system for identifying and facilitating purchase of an application.

FIG. 1 illustrates an example system 100 for identifying and facilitating purchase of an application. The system 100 includes an application recognition client 125 running on a first user device 105 connected via a network 106 to an application recognition server 130 running on a server system 120. The network 106 may be a private network (e.g., a local area network (LAN) or wide area network (WAN), a public network (e.g., the Internet), or a combination thereof.

A user of the first device 105 may initiate the application recognition client 125, and may aim an image capture device (not shown) of the first user device 105 towards a second user device 110. The second user device 110 may be running an application. A particular application state 118 of the running application may be shown in a display of the second user device 110. The first user device 105 may capture an image 135 of the display of the second user device 110, the image including the current displayed application state 118 for the application. The first user device 105 may generate a single image, a sequence of still images, or a video of the second user device's 110 display. Additionally, the first user device 105 may record audio output by the second user device 110 caused by execution of the application.

Application recognition client 125 may transmit the image 140 to the application recognition server 130. The application recognition server 130 may include a repository of images (e.g., screen shots) associated with a multitude of different applications. Applications may have identifiable icons, pictures, fonts, menu bars, game characters, user interfaces, or other visual features that can be used to identify those applications. Accordingly, application recognition server 130 may compare the received image (or images or video) to images in the repository of images. Once a match is found between the received image and an image in the repository, application recognition server 130 identifies the application running on the second user device 110 as being the application associated with the matching image. Application recognition server 130 may then transmit application information 145 (e.g., an identity of the application) back to first user device 105.

Application recognition server 130 may additionally determine a vendor (e.g., an app store) that provides the application for purchase (or free download), and may direct the application recognition client 125 to the vendor. Application recognition client 125 may present the user of the first user device 105 with an option to purchase and/or install the application. Responsive to the user providing input to purchase the application, first user device 105 may purchase, download and install the application.

In addition to capturing an image of an executing application, the first user device 105 may capture an image of an icon associated with an application (e.g., a thumbnail image of the application). For example, a user may view a list of applications (apps) from a smart television (TV) or a home screen of another user device. The user may take an image of the list of apps or home screen, and this image may be transmitted to the application recognition server 130. The application recognition server 130 may process the image of the icon in a similar manner to that described with reference to images of operating states of executing applications. In addition, a single image may include, for example, icons of multiple different applications. In such an instance, the application recognition server 130 may identify each of the applications having icons represented in the image, and may provide a user of the user device an option to download those applications having compatible versions with the user device. Embodiments are described below with reference to images of running applications. However, it should be understood that these embodiments are also applicable to identifying applications based on other images associated with applications, such as icons of those applications.

Figure 2:
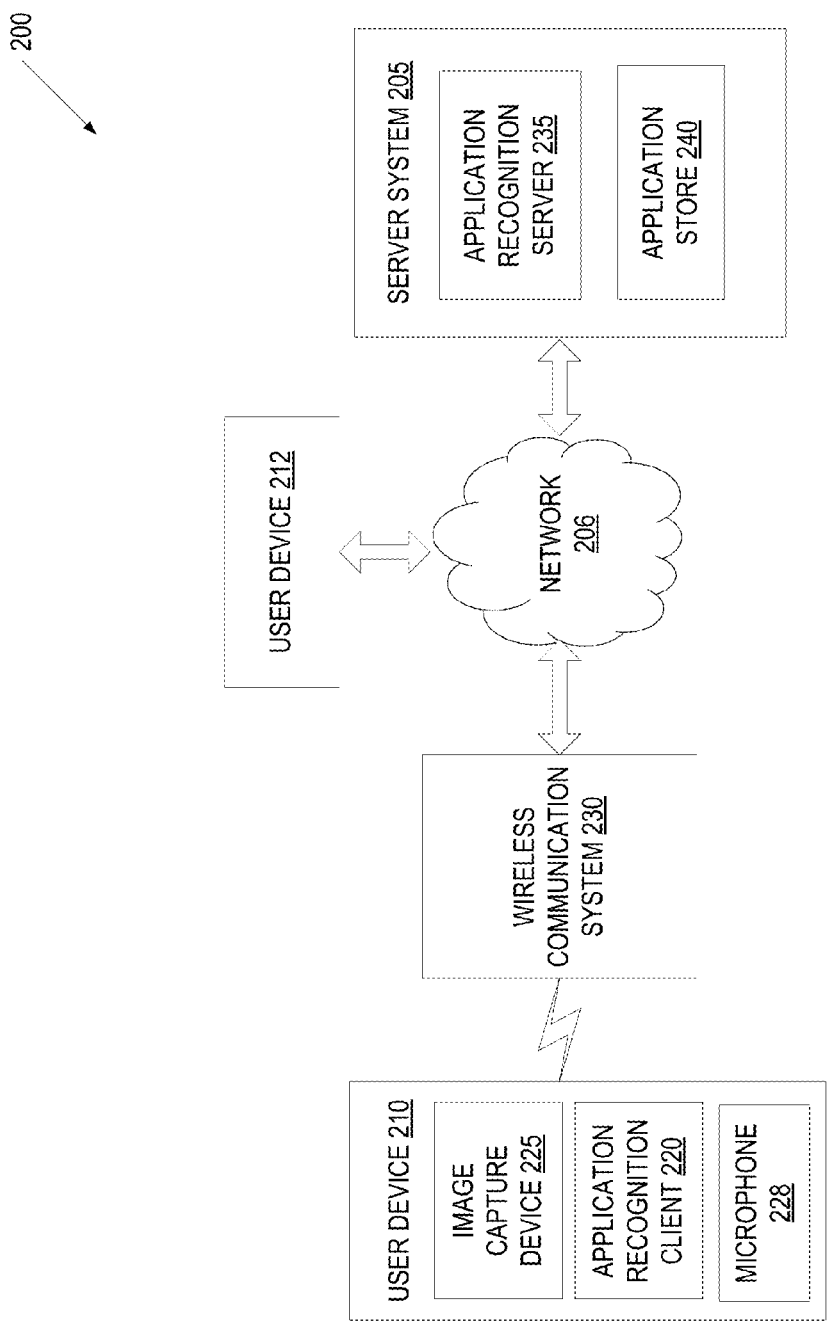
FIG. 2 is a block diagram of an example network architecture, in which embodiments of the present invention may operate.

FIG. 2 is a block diagram of an example network architecture 200, in which embodiments described herein may operate. The network architecture 200 may include a server system 205 and one or more user devices 210, 212, which may be capable of communicating with the server system 205 via a network 206 (e.g., a public network such as the Internet, a private network such as a local area network (LAN), or a combination thereof).

The user devices 210, 212 may be portable computing devices such as an electronic book reader, notebook computer, mobile phone, tablet computer, personal digital assistant (PDA), portable media player, netbook, and the like. The user devices 210, 212 may also be non-portable computing devices such as a desktop computer, a set-top box associated with a television, a gaming console, an embedded computing device, and so on. First user device 210 and second user device 212 may be the same type of user devices or different types of user devices. For example, first user device 210 may be an Android® operating system based mobile device and the second user device may be an iOS® device. In another example, first user device 210 may be a mobile phone and second user device 212 may be a desktop computer.

Some user devices (e.g., user device 210) may be connected to the network 206 and/or to other user devices via a wireless communication system 230. The wireless communication system 230 may be a wireless infrastructure that allows users to use the user devices to communicate with server system 205 without being tethered to the server system 205 via hardwired links. Wireless communications system 230 may be a wireless fidelity (WiFi) hotspot connected with the network 206. Wireless communication system 230 may alternatively be a wireless carrier system (e.g., as provided by Verizon®, AT&T®, T-Mobile®, etc.) that can be implemented using various data processing equipment, communication towers, etc. Alternatively, or in addition, the wireless communication system 230 may rely on satellite technology to exchange information with the user device 210. Other user devices (e.g., user device 212) may be connected to the network via a wired connection (e.g., via an Ethernet connection).

In one embodiment, the network architecture 200 includes a communication-enabling system (not shown) that serves as an intermediary in passing information between the server system 205 and the wireless communication system 230. The communication-enabling system may communicate with the wireless communication system 230 (e.g., a wireless carrier) via a dedicated channel, and may communicate with the server system 205 via a non-dedicated communication mechanism, e.g., a public Wide Area Network (WAN) such as the Internet.

User device 210 includes an image capture device 225 and an application recognition client 220. Image capture device 225 may be, for example, a complimentary metal-oxide-semiconductor (CMOS) image sensor or a charge-coupled device (CCD) image sensor integrated into the user device. Alternatively, the image capture device may be a peripheral device such as a webcam connected to the first user device 210 via, for example, a universal serial bus (USB), firewire, Bluetooth, Zigbee, or thunderbolt connection. The image capture device 225 may capture just still photographs, or may capture both still photographs and videos. In addition to the image capture device 225, user device 210 may also include a microphone 228 to capture audio.

Application recognition client 220 may interface with the image capture device 225 to cause the image capture device 225 to capture an image (or video) while a lens of the image capture device 225 is pointed at a display of another user device (e.g., user device 212). The other user device may be running an application, with a visual output of the application shown on a display. Once an image is captured (which includes a state of the application as output to the display of the other user device), application recognition client 220 may transmit the image to server system 205 for analysis. The image may be bundled into a message that includes an instruction to identify an application using the image. Alternatively, or additionally, application recognition client 220 may generate a descriptor of the image based on the contents of the image, and may send the descriptor to the server system 205.

The descriptor may be a reduced representation set of features of the image, referred to as a feature vector, that minimizes the amount of resources used to describe a large set of data accurately. The feature vector may be an n-dimensional vector of numerical features that represent pixels or regions (e.g., groups of pixels) within the image. The features may include subsets of the image domain, and may take the form of isolated points, continuous curves and/or connected regions. For example, the groups of pixels may represent objects, corners, edges, blobs, ridges, intersections, and so forth within the image, each of which may be assigned vectors (e.g., numerical values). In some examples, features may relate to motion in image sequences (e.g., for videos), shapes defined in terms of curves or boundaries between different image regions, and/or properties of regions. In one embodiment, the descriptor is generated by performing feature detection and/or feature extraction on the image. A histogram of features and/or feature vectors of the image may be generated to form the descriptor in an embodiment.

The server system 205 may include one or more machines (e.g., one or more server computers, routers, gateways, etc.) that have processing and storage capabilities to provide server-based functionality. The server system 205 may be implemented by a single machine or a cluster of machines, each of which may include data stores and/or other data processing equipment. In one embodiment, the server system 205 includes one or more network based servers, which may be hosted, for example, by network based hosting services such as Amazon's® Elastic Compute Cloud® (EC2).

The server system 205 includes an application recognition server 235, which may provide network-accessible server-based functionality. In one embodiment, the application recognition server 235 provides an application recognition service to user devices 210, 212. In response to receiving a message requesting application identification, the application recognition server 235 may compare an image included in the message to a repository of images. This may include generating a descriptor of the image, and comparing the generated descriptor to stored descriptors of images for known applications. Alternatively, the descriptor may have been generated by application recognition client 220 and included in the message.

Once application recognition server 235 finds a match between the received image and a stored image associated with a known application, application recognition server 235 identifies that known application as the application pictured in the received image. Application recognition server 235 may report the identity of the application to the application recognition client 220, and may provide other information pertaining to the application, such as an application store from which the identified application can be purchased. Other information that may be sent to the first user device 210 includes manuals or other documents associated with the application (e.g., cheats for a game), information on available plug-ins for the application, related applications, applications also purchased by those who purchased the identified application, alternative applications that provide similar functionality to the identified application, and so on.

In one embodiment, server system 205 additionally includes an application store 240. In addition to sending first user device 210 an identity of the application, application recognition server 235 may automatically direct application recognition client to the application store 240, and in particular to purchase information for the application from the application store 240. A user of first user device 210 may perform a single press of a purchase button to purchase the application, download it, and install it on first user device 210.

Figure 3:
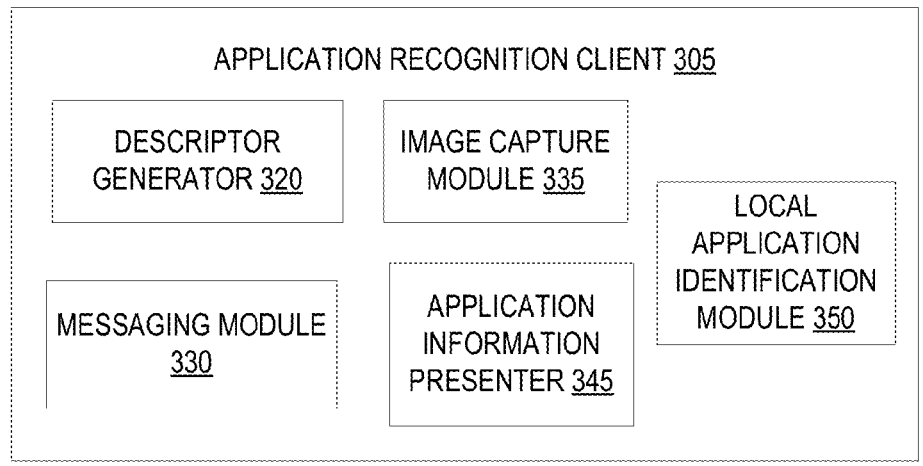
FIG. 3 is a block diagram of one implementation of an application recognition client.

FIG. 3 is a block diagram of one implementation of an application recognition client 305, which may correspond to application recognition client 220 of FIG. 2. Application recognition client 305 may include a descriptor generator 320, a messaging module 330, an image capture module 335 and an application information presenter 345. In alternative implementations, the functionality of the descriptor generator 320, messaging module 330, image capture module 335 and/or application information presenter 345 may be combined into a single module or may be subdivided into multiple modules. Application recognition client 305 may also include other modules, such as a local application identification module 350.

Image capture module 335 interfaces with an image capture device to cause the image capture device to generate an image or a video. Image capture module 335 may activate the image capture device, and may receive image data from the image capture device for presentation on a display. Once a user is satisfied with an image presented in a view finder, the user may press an image capture button, which may cause an image to be taken or may cause a video to begin recording. If a video has begun recording, then a second press of the image capture button may cause the image capture device to stop recording the video. Image capture module 335 may additionally interface with a microphone to cause the microphone to record audio. The microphone may record the audio as a video is being taken, and the audio may be integrated into the video.

Once an image, series of images or video is generated, image capture module 335 may provide the image, images or video to messaging module 330 and/or to descriptor generator 320. Messaging module 330 generates an application identification request message for transmission to an application recognition server. The message may include data indicating an operating system of a user device on which the application recognition client 305 runs, available resources of the user device, application stores with which a user of the user device has an account and/or other information. Alternatively, such information may not be included in the message. In one embodiment, messaging module 330 adds the image, images or video to the message. Alternatively, messaging module 330 may request descriptor generator 320 to generate a descriptor for the image based on contents of the image, images or video. Messaging module 330 may then include the descriptor in the message rather than the image, images or video.

In one embodiment, messaging module 330 makes a determination as to whether to send an image (or sequence of images or video) to the application recognition server or to generate a descriptor (or set of descriptors) and send the descriptor to the application recognition server. A descriptor may be significantly smaller than an image, and thus may consume less bandwidth when transmitted. However, the operations involved in generating the descriptor may be processor intensive and may drain a battery life of the user device. Messaging module 330 may determine an available bandwidth, available battery life, available processor resources, and/or other available resources. Messaging module 330 may then determine whether to generate a descriptor and add it to a message or to add an image (or images or video) to the message. For example, if there is a slow network connection, and the user device has ample battery life, then messaging module 330 may determine that a descriptor is to be included in the message. However, if there is a high bandwidth network connection and/or the user device has low battery life, then messaging module 330 may determine that the image is to be included in the message.

If messaging module 330 determines that a descriptor is to be included in the message, it instructs descriptor generator 320 to create a descriptor of the image. In one embodiment, descriptor generator 320 applies a corner detection technique to generate the descriptor. Alternatively, messaging module 330 may apply blob detection techniques, ridge detection techniques, edge detection techniques, or other feature identification techniques to generate the descriptor. Combinations of image identification and/or image recognition techniques may also be used to generate the descriptor.

If a corner detection technique is used to create the descriptor, descriptor generator 320 may identify intersections of edges in the image. Those points in the image with well defined intersections of edges may be identified as interest points (also referred to as features). Once interest points are detected, the distribution of these interest points and the regions around them should remain the same for the same image, even if different image sizes are used. Accordingly, once these interest points are identified, descriptor generator 320 may identify characteristic neighborhood sites around these points of interest, and generate a feature vector for that neighborhood. A set of interest points (features) may be generated for the image, and each interest point may have a multi-dimensional feature vector. A histogram or other set of these feature vectors may be used to create a final descriptor for the image.

In one embodiment, a bag-of-words model (BoW model) is applied to the features to generate the final descriptor. Each feature vector for the features may be treated as a word. Accordingly, each feature vector may be converted into a standard code word. Standard code words may be code word feature vectors generated from a set of images, where each standard code word feature vector is common within the set of images. Descriptor generator 320 may create a histogram of the standard code words. This histogram may be used as a descriptor for the image.

If a set of images or a video is provided, then descriptor generator 320 may generate a separate descriptor for each image in the set. For a video, a descriptor may be generated for each frame of the video. Alternatively, a descriptor may be generated for only a portion of the frames (e.g., from every tenth frame). Additionally, descriptor generator 320 may compute gradients for each of the feature vectors using comparisons of the feature vectors for the different frames of the video. The gradients may be 3 directional gradients, including gradients in the x and y directions as well as gradients in the time direction. One or a few descriptors may be generated for a video that incorporate feature vectors as well as gradients for those feature vectors.

A video may provide additional information to that provided by a still image, such as how game characters move, the nature of characters on a screen, how a game is played, and so forth. Additionally, a video may include an audio component. In one embodiment, in which a video has been recorded, descriptor generator 320 generates an audio descriptor of an audio component of the video as well as an image descriptor of an image component of the video. The audio descriptor may be a multi-dimensional feature vector of the audio. In an alternative embodiment, description generator 320 may generate a combined descriptor that includes both extracted audio features and extracted video features.

Once messaging module 330 has generated a message (including an image or a descriptor as appropriate), messaging module 330 may send the message to the application recognition server. Messaging module 330 may then receive a response message with either an identification of an application or with a message that an application could not be identified. If an application was identified, additional information may be received, such as an application store from which the application may be purchased, an option to purchase the application, an option to download the application, texts written for the application, identification of alternative applications, and so forth.

Application information presenter 345 may present the received information pertaining to the identified application. Additionally, application information presenter 345 may provide an interface usable by a user to purchase the application, to purchase related applications, to purchase recommended applications, and so forth. Responsive to a user inputting an application purchase command, messaging module 330 may send a purchase request to an application store, which may start a download and installation process for the application.

In one embodiment, application recognition client 305 includes a local application identification module 350. The local application identification module 350 may maintain a local data store with descriptors for popular applications. Prior to messaging module 330 querying an application recognition server, local application identification module 350 may compare the descriptor for the image to descriptors stored in the local data store. If a match is found, then local application identification module 350 may identify the application without querying the application recognition server. Local application identification module 350 may then report the identity of the application and other information pertaining to the application to application information presenter 345 for presentation.

Figure 4:
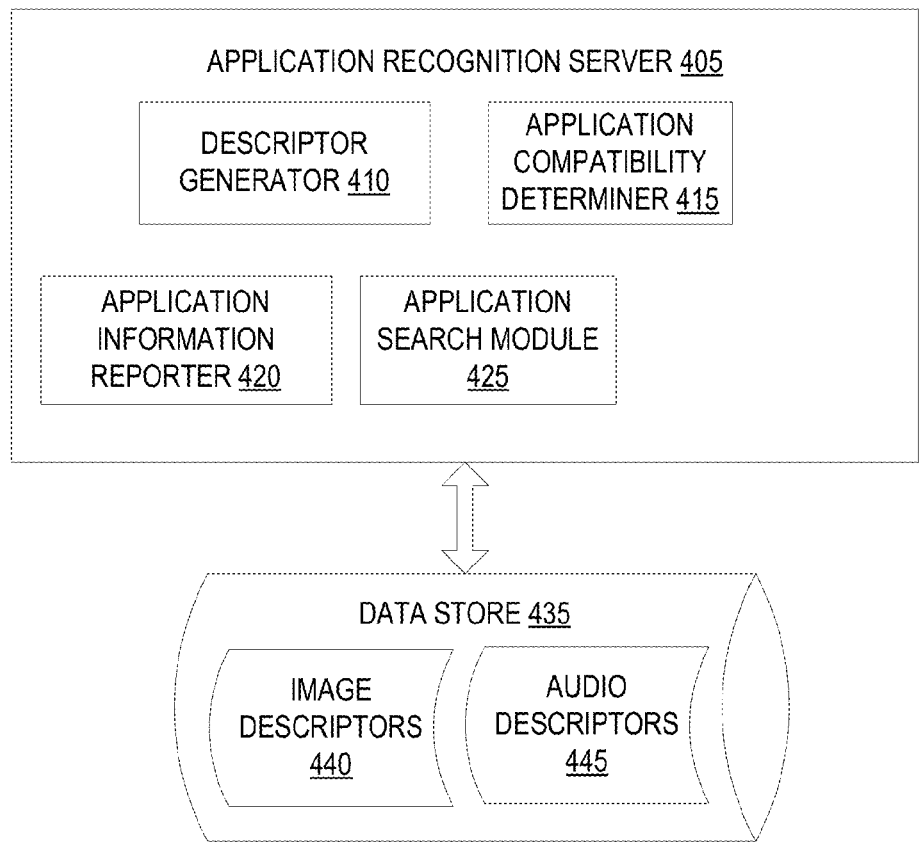
FIG. 4 is a block diagram of one implementation of an application recognition server.

FIG. 4 is a block diagram of one implementation of an application recognition server 405, which may correspond to application recognition server 235 of FIG. 2. Application recognition server 405 may include one or more of a descriptor generator 410, an application compatibility determiner 415, an application information reporter 420 and an application search module 425. In alternative implementations, the functionality of the descriptor generator 410, the application compatibility determiner 415, the application information reporter 420 and/or the application search module 425 may be combined into a single module or may be subdivided into multiple modules.

Application recognition server 405 receives a message from an application recognition client. The message may be an application identification query that includes an image (or set of images or video) or a descriptor of an image (or set of images or video) from an application recognition client. The image may be an image of an unidentified application. In some embodiments the message may also include an audio descriptor. Alternatively, the message may include a combined descriptor that includes both image features derived from one or more images and audio features derived from audio. If the message does not include a descriptor, then descriptor generator 410 generates an image descriptor (or multiple image descriptors) using the techniques described with reference to descriptor generator 320. Additionally, if a video with an audio component is received (or separate audio data is received), descriptor generator 410 may generate an audio descriptor. Descriptor generator 410 may also generate a combined descriptor that includes both audio features and image features rather than generating separate audio and image descriptors.

Typically, application recognition server 405 will run on a server system that has greater resources than those available to the application recognition client running on a user device. For example, the server system may have greater processing power, greater memory, faster processors, no power restrictions, greater disk space, and so forth. Accordingly, descriptor generator 410 may be able to generate descriptors more quickly than descriptor generator 320. Additionally, descriptor generator 410 may use more processor intensive algorithms to create more detailed descriptors, which may improve an ability to match the generated descriptor to stored descriptors of images for known applications.

Application search module 425 performs a search of image descriptors 440 for images of known applications to find a match to the generated or received descriptor. A similar search may be performed using a received or generated audio descriptor and searching for a matching audio descriptor 445 if an audio descriptor is available. The image descriptors 440 and/or audio descriptors 445 (or combined descriptors) may be stored in a data store 435 (e.g., a database) that is optimized for the storage of large files. For example, image descriptors 440 may be 100 to 1000 dimensional floating point values. Accordingly, descriptors may be several kilobytes in size. Data store 435 may be optimized for rapid search and matching of large descriptors. The data store 435 may be periodically updated with new image descriptors and/or new audio descriptors 445 as new applications become available. Additionally, users may periodically upload new screen shots of applications. Descriptors for these new screen shots may be generated, associated with the appropriate application, and added to the data store 435.

For each stored image descriptor, application search module 425 may generate a similarity score that indicates an amount of difference between the generated or received image descriptor and the stored image descriptor being compared to. The stored descriptors may be ranked based on their similarity scores. A stored descriptor having a greatest similarity score may be identified as a match to the received/generated descriptor. In one embodiment, a match is verified by determining whether the stored descriptor has less than a threshold amount of difference from the generated/received descriptor (e.g., if the similarity score is higher than a threshold). If the similarity score for the closest descriptor does not meet the threshold, then application search module 425 may determine that there is no match. If a match is found, then application search module 425 may identify an application associated with the matching descriptor as the unidentified application in question.

If an audio descriptor associated with the received message (e.g., a received audio descriptor or an audio descriptor generated from a received video) is available, than the audio descriptor may be compared to stored audio descriptors 445 to identify a closest matching audio descriptor. The audio descriptor may be used instead of or in addition to the image descriptor to identify the application. For example, if an application associated with the closest matching audio descriptor corresponds to an application associated with a closest matching image descriptor, then a confidence in the match may be increased.

In one embodiment, uniquely identifying visual indicators are intentionally added to applications to simplify and increase the accuracy of application identification. For example, a digital water mark may be added to a background of application displays. Alternatively, a particular image pattern may be added to an application's display. The image pattern may include different colors that alternate between frames of the display. The pattern may average out to a neutral color such as white to the human eye, and so may be undetectable to users. However, the pattern may be recognizable to descriptor generator 410. The image may be a numeric or alphanumeric code that represents an application identifier or may be a unique pattern associated with an application identifier. The application search module 425 may identify the application identifier and perform a lookup in a table or other data structure to identify an application associated with that application identifier.

Once an application is identified, application compatibility determiner 415 may determine whether there is a version of the identified application that is compatible with a user device from which the message was received. Information about the user device such as an operating system that it runs and performance properties of the user device may have been included in the received message. Alternatively, application compatibility determiner 415 may already have such information for the user device. If a compatible version of the application is available (e.g., a version that runs on the operating system of the user device and that does not have resource criteria that exceeds available resources of the user device), then application compatibility determiner 415 may automatically select that version of the application for the user device. If no such compatible version of the application is available, application compatibility determiner 415 may identify similar applications that perform similar operations and provide similar services. For example, if the identified application was the Microsoft Word application, application compatibility determiner 415 may identify Open Office as an alternative.

Application information reporter 420 sends information pertaining to the identified application to the user device. Such information includes the identity of the application as well as an application store from which the application can be purchased. Application information reporter 420 may redirect a user device to the application store, which may be hosted by a same or different server system than the server system that hosts the application recognition server 405. Application information reporter 420 may also provide the user device with an option to purchase the compatible version of the application from the application store. If a compatible version of the application was not available, then application information reporter 420 may suggest one or more alternative applications, and may provide an ability to purchase the alternative applications from the application store. Application information reporter 420 may also provide information on manuals, cheats, texts, plug-ins, updates and other information pertaining to the identified application. Application information reporter 420 may provide the user device with options to download and/or purchase any and all of these additional related items.

In one embodiment, application information reporter 420 receives location information for many user devices, and receives application execution information for those user devices. Application information reporter 420 may notify the user device of other nearby user devices that are running the identified application. For example, if the application is a game, then application information reporter 420 may report on others that the game can be played with in a multi-player mode.

In some instances, a user may desire to install the application on a different user device than the user device that was used to generate the application identification query. Accordingly, application information reporter 420 may provide a user with an option to install the application on a different user device. Some user devices may be registered with a server system that hosts the application recognition server 405. Accordingly, application information reporter 420 may automatically provide options to install the application on any of those other registered user devices. If a different user device is selected, then application compatibility determiner 415 may perform a new compatibility check for that other user device to identify a version of the application compatible with the other user device. the identified version of the application may then be offered for download to the other user device.

If the user wishes to install the application on another user device that is not registered to the application recognition server 405, then the user may provide an email address to email installation instructions to. The user may open the email address from the other user device that he wishes to have the application installed to, and this may initiate installation of the application on that user device.

Figure 5:
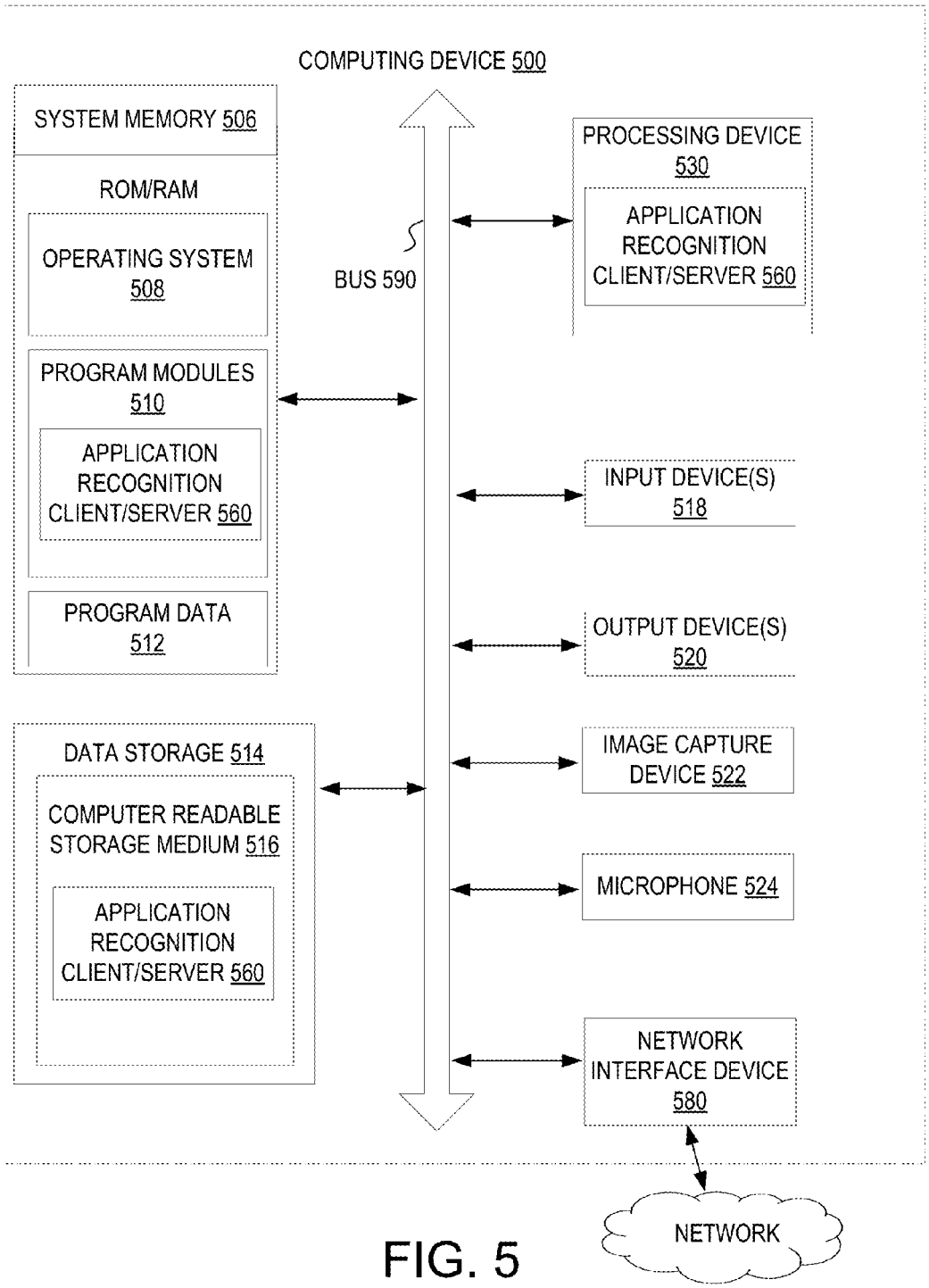
FIG. 5 is a block diagram illustrating an example computing device, in accordance with embodiments of the present invention.

FIG. 5 is a block diagram illustrating an exemplary computing device 500, in accordance with one embodiment of the present invention. The computing device 500 may correspond to user device 210 of FIG. 2 and/or to server system 205 of FIG. 2. Computing device 500 may be any type of computing device such as an electronic book reader, a PDA, a mobile phone, a laptop computer, a portable media player, a tablet computer, an electronic pad, a desktop computer, a camera, a rackmount server, a video camera, a netbook, and the like.

The computing device 500 includes a processing device 530, which may include one or more processors such as CPUs, microcontrollers, field programmable gate arrays, or other types of processors. The computing device 500 also includes system memory 506, which may correspond to any combination of volatile and/or non-volatile storage mechanisms. The system memory 506 stores information which provides an operating system component 508, various program modules 510 such as an application recognition client or server 560, and/or other components (e.g., a web browser). The computing device 500 performs functions by using the processing device 530 to execute instructions provided by the system memory 506.

The computing device 500 also includes a data storage device 514 that may be composed of one or more types of removable storage and/or one or more types of non-removable storage. The data storage device 514 includes a computer-readable storage medium 516 on which is stored one or more sets of instructions embodying any one or more of the methodologies or functions described herein. As shown, instructions for the application recognition client or server 560 may reside, completely or at least partially, within the computer readable storage medium 516, system memory 506 and/or within the processing device 530 during execution thereof by the computing device 500, the system memory 506 and the processing device 530 also constituting computer-readable media. The computing device 500 may also include one or more input devices 518 (keyboard, mouse device, specialized selection keys, etc.) and one or more output devices 520 (displays, printers, audio output mechanisms, etc.). Additionally, the computing device 500 may include an image capture device 522 and/or a microphone 524.

The computing device 500 may also include a network interface device 580 to enable computing device 500 to communicate via a network. For example, network interface device 580 may be a wireless modem that allows the computing device 500 to communicate via a wireless network (e.g., such as provided by the wireless communication system) with other computing devices, such as a server system and/or other computing devices. The network interface device 580 may be a wireless modem that allows the computing device 500 to handle both voice and non-voice communications (such as communications for text messages, multimedia messages, media downloads, web browsing, etc.) with the wireless communication system 520. The wireless modem may provide network connectivity using any type of mobile network technology.

FIGS. 6-9 are flow diagrams of various implementations of methods related to identifying applications and facilitating the purchase of identified applications. The methods are performed by processing logic that may include hardware (circuitry, dedicated logic, etc.), software (such as is run on a general purpose computer system or a dedicated machine), or a combination of both. Some methods may be performed by an application recognition client 305 of FIG. 3, while other methods may be performed by an application recognition server 405 of FIG. 4.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 6:
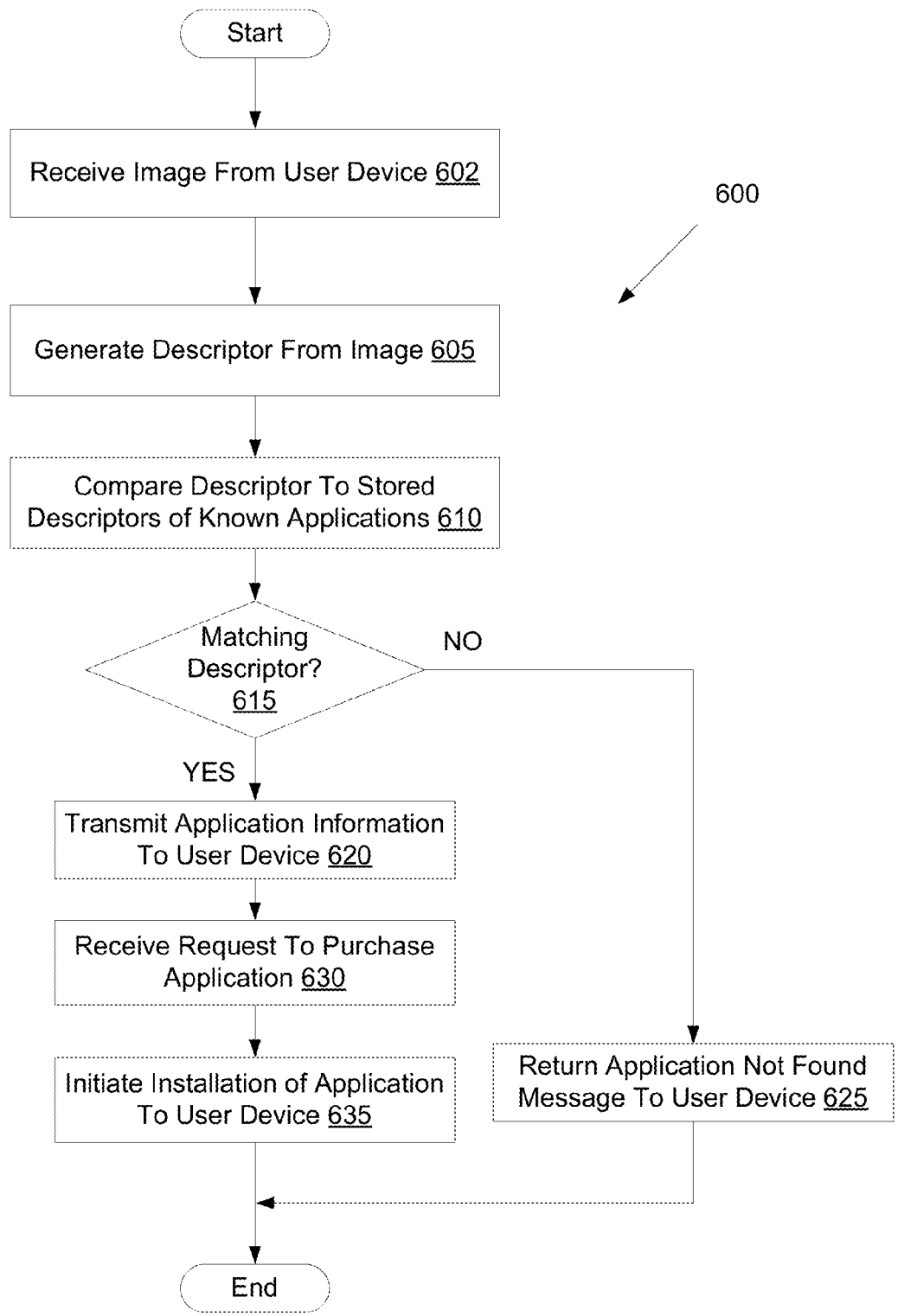
FIG. 6 is a flow diagram of one embodiment for a method of identifying an application.

FIG. 6 is a flow diagram of one embodiment for a method 600 of identifying an application. At block 602 of method 600, processing logic receives an image from a user device. The image may be included in a message that is received from the user device. The received message may be a request to identify an application pictured in the included image. The received message may additionally include attached audio.

At block 605, processing logic generates an image descriptor from the image. The image descriptor may be a histogram of feature vectors of the image. Processing logic may also generate an audio descriptor if the message included an audio portion, where the audio descriptor may be a histogram of feature vectors of the audio. At block 610, processing logic compares the image descriptor to stored image descriptors of known applications. Processing logic may also perform a comparison of the audio descriptor to stored audio descriptors of the known applications.

At block 615, processing logic determines whether the generated image descriptor (and/or audio descriptor) matches any stored descriptors. In one embodiment, a closest descriptor is identified as a match. This may be performed both for the image descriptor and for the audio descriptor of the message. The match may then be verified by comparing a similarity score based on a difference between the generated descriptor and the matching descriptor to a threshold. If the similarity score is below the threshold, the match may be identified as a false match. If the similarity score meets the threshold, then the match may be verified. If a matching descriptor (e.g., a matching image descriptor and/or matching audio descriptor) is found, the method continues to block 620. Otherwise, the method continues to block 625, and processing logic returns an application not found message to the user device.

At block 620, processing logic transmits application information for the identified application to the user device that the image was received from. The application information may include an identity of the application, identification of an application store that the identified application can be purchased from, an option to purchase the identified application, and other information. At block 630, processing logic receives a request to purchase the application. At block 635, processing logic initiates installation of the application to the user device.

Figure 7:
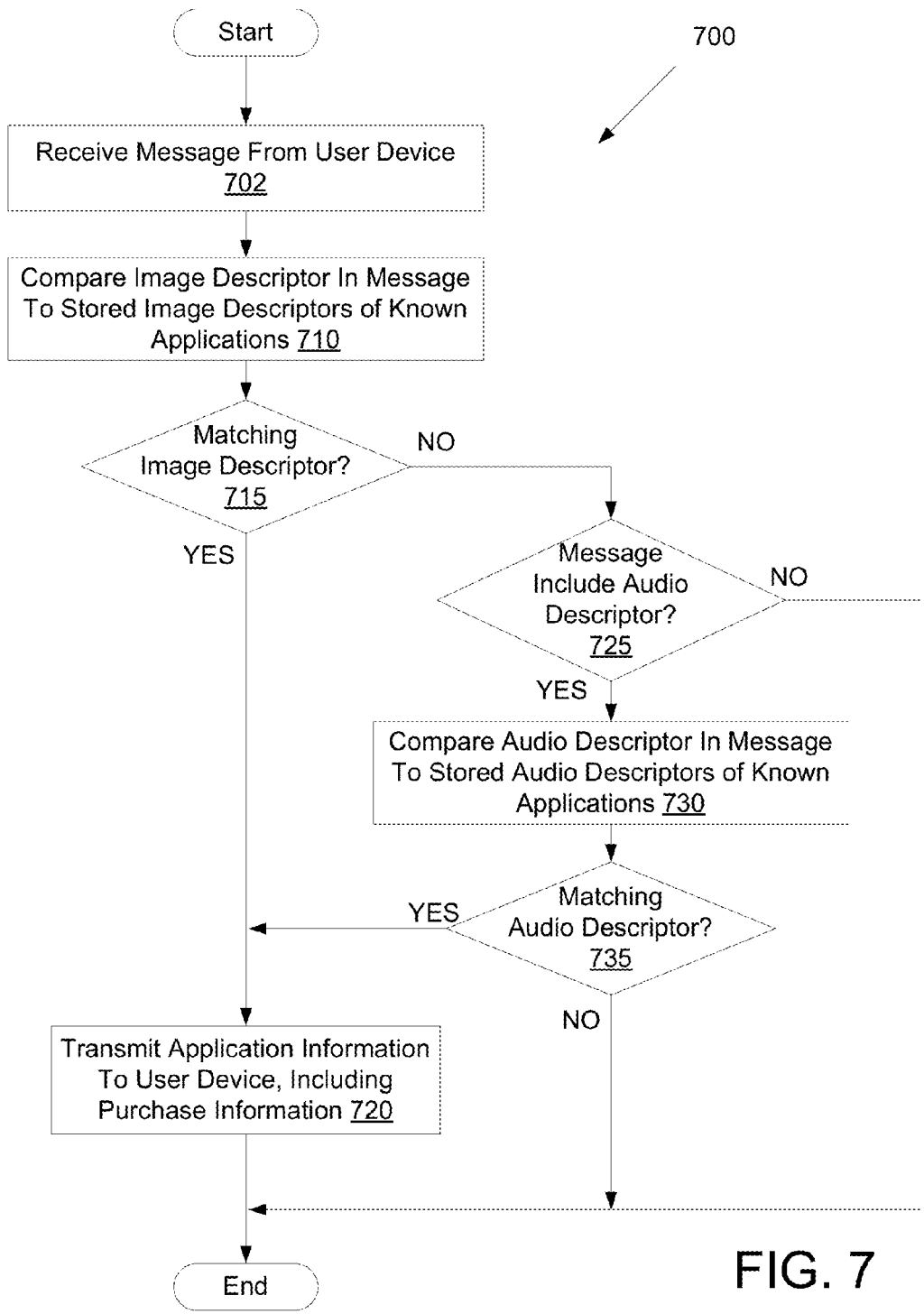
FIG. 7 is a flow diagram of another embodiment for a method of identifying an application.

FIG. 7 is a flow diagram of another embodiment for a method 700 of identifying an application. At block 702 of method 700, processing logic receives an image descriptor of an image from a user device. The image descriptor may be included in a message that is received from the user device. The received message may be a request to identify an unidentified application pictured in the included image.

At block 710, processing logic compares the image descriptor to stored image descriptors of known applications. At block 715, processing logic determines whether the received image descriptor matches any stored image descriptors associated with known applications. If the received image descriptor matches a stored image descriptor, then the unidentified application may be identified as the known application that is associated with the matching image descriptor. Accordingly, if a match is found, the method proceeds to block 720. Otherwise, the method continues to block 725.

At block 725, processing logic determines whether the message includes an audio descriptor. The audio descriptor may have been generated from recorded audio including music, sound effects and so forth produced by an application. If the message includes an audio descriptor, the method proceeds to block 730. Otherwise the method ends.

At block 730, processing logic compares the received audio descriptor in the message to stored audio descriptors associated with known applications. At block 735, processing logic determines whether the received audio descriptor matches any of the stored audio descriptors. If a match is found, the method continues to block 720. Otherwise, the method ends.

At block 720, processing logic transmits application information for the identified application to the user device that the image was received from. The transmitted application information may include an option to purchase the identified application from an application store that offers that application.

Note that the audio descriptor may also be used for comparison in instances where the received image descriptor matches a stored image descriptor. In such an implementation, the audio descriptor may be used to confirm the identity of the unknown application.

Figure 8:
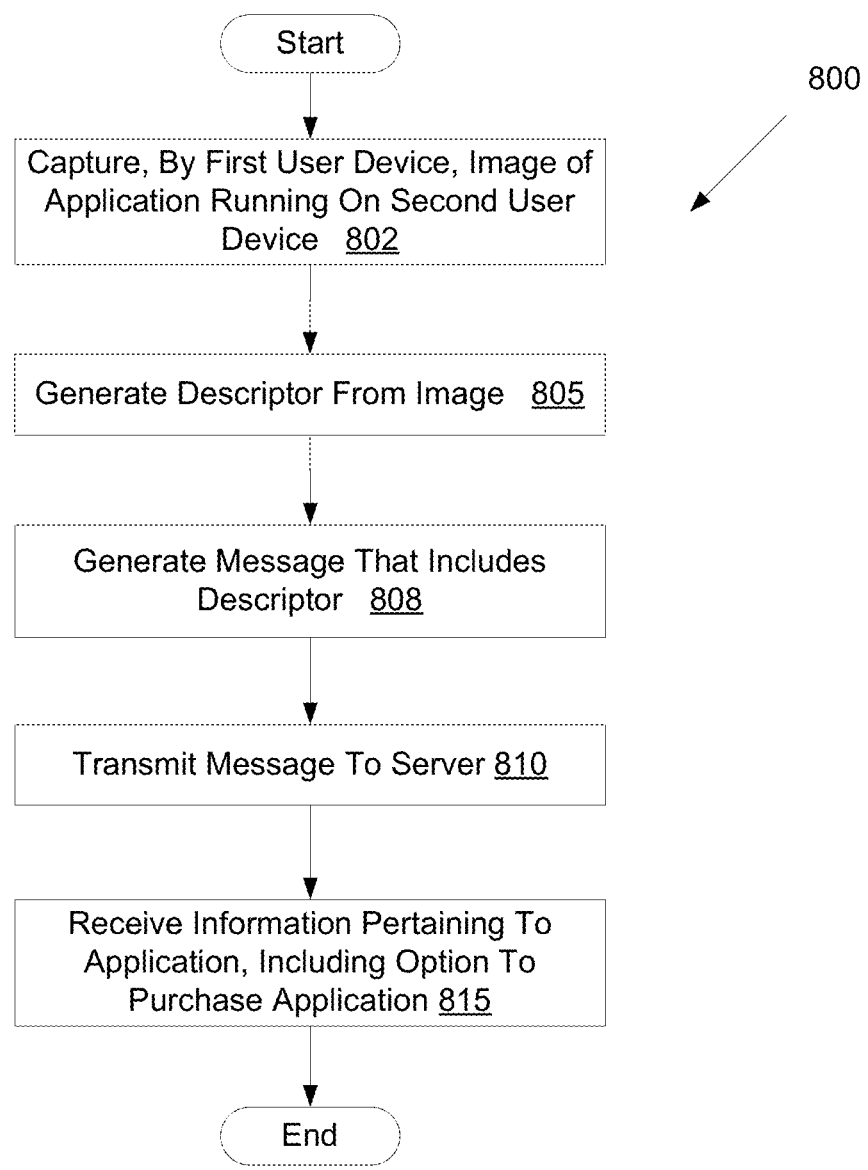
FIG. 8 is a flow diagram of one embodiment for a method of querying a server to identify an application.

FIG. 8 is a flow diagram of one embodiment for a method 800 of querying a server to identify an application. At block 802 of method 800, processing logic for a first user device captures an image of an application running on a second user device. Alternatively, processing logic may capture multiple images, or capture a video. The captured video may include only a visual component, or may include both a visual component and an audio component. At block 805, processing logic generates a descriptor (or multiple descriptors) from the image. The descriptor may be created using techniques described above with reference to FIG. 3. If a video including an audio component was captured, then an audio descriptor may also be generated from the audio component of the video. At block 808, processing logic generates a message that includes the descriptor. AT block 810, processing logic transmits the message to a server. At block 815, processing logic receives information pertaining to the application. The received information may include an option to purchase the application from an application store.

Figure 9:
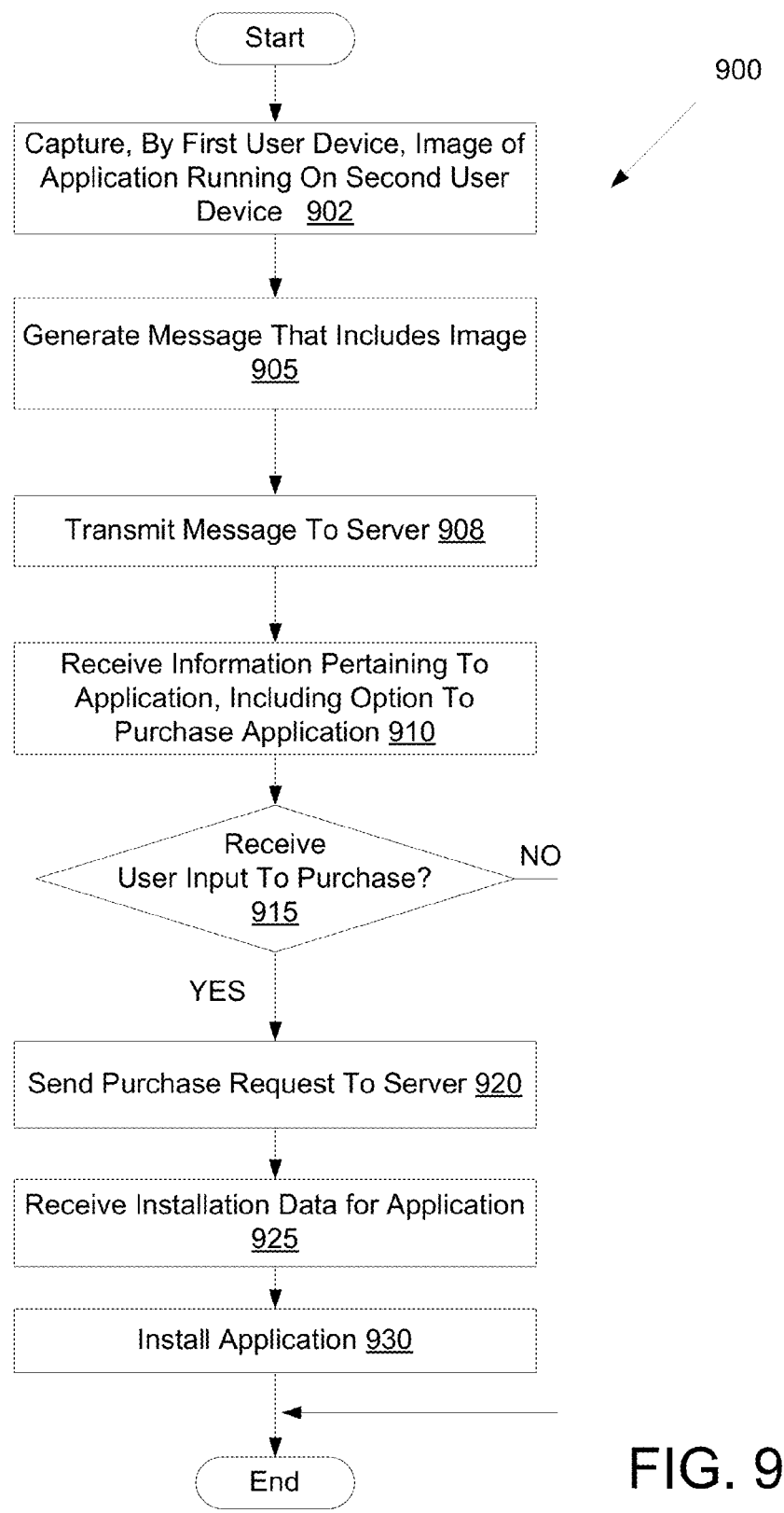
FIG. 9 is a flow diagram of another embodiment for a method of querying a server to identify an application.

FIG. 9 is a flow diagram of another embodiment for a method 900 of querying a server to identify an application. At block 902 of method 900, processing logic for a first user device captures an image of an application running on a second user device. Alternatively, processing logic may capture a sequence of images or may capture a video. The video may or may not contain an audio component. At block 905, processing logic generates a message that includes the image (or sequence of images or video). At block 908, processing logic transmits the message to a server.

At block 910, processing logic receives information pertaining to the application. The received information may include an identity of the application and an option to purchase the application from an application store. At block 915, processing logic determines whether user input to purchase the application is received. If such user input is received, the method continues to block 920. Otherwise the method ends.

At block 920, processing logic sends a purchase request to the server (or to an alternative server identified in the received information that is offering the application for sale). At block 925, processing logic receives installation data for the application. At block 930, processing logic installs the application.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "comparing", "identifying", "generating", "initiating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a processing device, an image from a first user device, the image comprising a likeness of an application running on a second user device, the image having been captured using an image sensor associated with the first user device;
    generating, by the processing device, a first descriptor based on the image;
    comparing, by the processing device, the first descriptor to one or more stored image descriptors associated with each of a plurality of known applications;
    identifying, by the processing device, a known application of the plurality of known applications having an associated image descriptor that most closely matches the first descriptor as the application; and
    sending, by the processing device, a notification of the identified application to the first user device, wherein the notification comprises an option to obtain the identified application.

2. The method of claim 1, wherein the image is one of a plurality of images included in a video of the application, wherein the video is received from the first user device, and wherein the descriptor is based on the plurality of images.

3. The method of claim 1, further comprising:
    receiving, from the first user device, audio associated with the application in addition to the image;
    generating a second descriptor based on the audio; and
    comparing the second descriptor to one or more stored audio descriptors associated with each of the plurality of known applications.

4. The method of claim 1, further comprising:
    determining a version of the identified application that is compatible with the first user device; and providing an indication of the compatible version of the identified application for installation on the first user device.

5. The method of claim 1, wherein the first descriptor comprises a feature vector, each feature in the feature vector representing pixels or regions within the image.

6. A computer readable storage medium having instructions that, when executed by a processing device, cause the processing device to perform operations comprising:
   receiving, from a user device, image information associated with an image captured by the user device, the image information providing an indication of an application installed in the user device or a second electronic device;
   determining, by analyzing the image information, a first descriptor associated with the application;
   comparing, by the processing device, the first descriptor to one or more stored image descriptors associated with each of a plurality of known applications;
   based at least in part on the comparing, determining, by the processing device, identifying information associated with the application; and
   sending, by the processing device, the identifying information to the user device.

7. The computer readable storage medium of claim 6, wherein the image comprises a likeness of the application in a state of operation.

8. The computer readable storage medium of claim 6, wherein the image comprises a likeness of an icon associated with the application.

9. The computer readable storage medium of claim 6, wherein the image information comprises an image, and wherein determining the first descriptor associated with the image comprises generating the first descriptor from the image.

10. The computer readable storage medium of claim 6, wherein the image information comprises the first descriptor, the first descriptor having been generated from the image, the first descriptor comprising a feature vector, wherein features in the feature vector represent at least one of pixels or regions within the image.

11. The computer readable storage medium of claim 6, wherein the image is one of a plurality of images included in a video of the application, wherein on the image information is associated with the plurality of images.

12. The computer readable storage medium of claim 6, the operations further comprising:
   receiving, from the user device, audio information associated with the application;
   determining, by analyzing the audio information, a second descriptor associated with the application; and
   comparing the second descriptor to one or more stored audio descriptors associated with each of the plurality of known applications; and
   determining the identifying information based at least in part on the comparing of the second descriptor to the one or more audio descriptors.

13. The computer readable storage medium of claim 6, wherein sending the identifying information comprises providing a user of the user device with an option to purchase the identified application.

14. The computer readable storage medium of claim 6, the operations further comprising:
   automatically causing the identified application to be installed on the user device.

15. The computer readable storage medium of claim 6, operations further comprising:
   receiving, from the user device, an indication of a second user device to install the identified application on; and
   initiating installation of the identified application on the second user device.

16. The computer readable storage medium of claim 6, the operations further comprising:
   determining whether a version of the identified application that is compatible with the user device is available; and
   responsive to identifying a compatible version of the identified application, selecting the compatible version of the identified application for installation on the user device.

17. The computer readable storage medium of claim 16, the operations further comprising:
   responsive to determining that no compatible version is available, suggesting a similar application to the user device.

18. The computer readable storage medium of claim 6, wherein the identifying information comprises an identity of the identified application and at least one of documentation associated with the identified application or recommendations of additional applications.

19. The computer readable storage medium of claim 6, wherein the identified application is a game, and wherein the information pertaining to the identified application comprises an identification of others that the game can be played with in a multi-player mode.

20. A method comprising:
   capturing, by a first user device, an image of an application running on a second user device;
   generating, by the first user device, a message that comprises image information associated with the image;
   transmitting, by the first user device, the message to a remote computing device; and
   receiving, by the first user device, identifying information from the remote computing device, the identifying information comprising an identification of the application and an option to purchase the application.

21. The method of claim 20, further comprising:
   determining whether descriptor generation criteria are satisfied; and
   generating a descriptor from the image responsive to determining that the descriptor generation criteria are satisfied, wherein the image information comprises the descriptor.

22. The method of claim 21, wherein the descriptor generation criteria comprise at least one of a local resource criterion usable to determine whether the first user device has sufficient local resources to generate the descriptor and a connection criterion usable to determine whether a network connection of the first user device has sufficient bandwidth to transfer the image.

23. The method of claim 20, further comprising:
   generating a video of the application, wherein the image is one of a plurality of images included in the video, and wherein the image information is associated with the plurality of images.

24. The method of claim 20, further comprising:
   capturing audio of the application; and
   adding audio information associated with the captured audio to the message.

25. The method of claim 20, wherein the identifying information further comprises at least one of documentation associated with the application or recommendations of additional applications.

26. A system comprising:
a first user device comprising a first memory and a first processing device coupled to the first memory, the first processing device to:
 capture an image of an application displayed on a second user device;
 generate a message that comprises image information associated with the image;
 transmit the message to a server computing device; and
 receive identifying information associated with the application from the server computing device, the identifying information comprising an identification of the application and an option to purchase the application.

27. The system of claim 26, the first processing device further to:
 determine whether descriptor generation criteria are satisfied; and
 generate a descriptor from the image responsive to determining that the descriptor generation criteria are satisfied, the image information comprising the descriptor.

28. The system of claim 27, wherein the descriptor generation criteria comprise at least one of a local resource criterion usable to determine whether the first user device has sufficient local resources to generate the descriptor and a connection criterion usable to determine whether a network connection of the first user device has sufficient bandwidth to transfer the image.

29. The system of claim 26, the first processing device further to:
 generate a video of the application, wherein the image is one of a plurality of images included in the video, and wherein the image information is associated with the plurality of images.

30. The system of claim 26, wherein the first processing device is further to:
 capture audio of the application; and
 add audio information associated with the captured audio to the message.

31. The system of claim 26, further comprising:
 the server computing device, comprising a second memory and a second processing device coupled to the second memory, the second processing device to:
 receive the message;
 generate a descriptor based on the image information;
 compare the descriptor to one or more stored descriptors associated with each of a plurality of known applications;
 determine the identifying information based at least in part on the comparison; and
 transmit the identifying information to the first user device.

32. The system of claim 31, the second processing device further to:
 determine a version of the identified application that is compatible with the user device is available; and
 provide an indication of the compatible version of the identified application for installation on the first user device.

33. The system of claim 26, wherein the image comprises a likeness of the application in a state of operation.

* * * * *